United States Patent
Reiffel

(10) Patent No.: US 7,237,947 B2
(45) Date of Patent: Jul. 3, 2007

(54) PRODUCT AND METHOD FOR MEASURING TEMPERATURE IN FLOWING OBJECTS

(76) Inventor: Leonard Reiffel, 602 Deming Pl., Chicago, IL (US) 60614

( * ) Notice: Subject to any disclaimer, the term of this patent is extended or adjusted under 35 U.S.C. 154(b) by 161 days.

(21) Appl. No.: 10/416,077

(22) PCT Filed: Nov. 1, 2001

(86) PCT No.: PCT/US01/45379

§ 371 (c)(1), (2), (4) Date: May 6, 2003

(87) PCT Pub. No.: WO02/059552

PCT Pub. Date: Aug. 1, 2002

(65) Prior Publication Data

US 2004/0013163 A1    Jan. 22, 2004

Related U.S. Application Data

(60) Provisional application No. 60/246,777, filed on Nov. 8, 2000.

(51) Int. Cl.
*G01K 13/02*    (2006.01)
*G01K 5/00*    (2006.01)

(52) U.S. Cl. .................. 374/148; 374/194; 374/201

(58) Field of Classification Search ............ 374/147, 374/148, 156, 187, 190, 194, 195, 198–201, 374/208, 210

See application file for complete search history.

(56) References Cited

U.S. PATENT DOCUMENTS

| | | | |
|---|---|---|---|
| 138,800 A | | 5/1873 | Grover |
| 1,496,784 A | | 6/1924 | Norwood |
| 2,652,726 A | * | 9/1953 | Gotthart ..................... 374/105 |
| 3,717,035 A | * | 2/1973 | Klingler et al. ............. 374/105 |
| 3,915,005 A | * | 10/1975 | Ayres ......................... 374/190 |
| 4,324,130 A | * | 4/1982 | Driker ......................... 374/24 |
| 4,907,896 A | * | 3/1990 | Martuscello et al. ........ 374/190 |
| 6,250,800 B1 | * | 6/2001 | Reiffel ......................... 374/137 |
| 6,422,746 B1 | * | 7/2002 | Weiss et al. ................. 374/156 |

* cited by examiner

*Primary Examiner*—Gail Verbitsky
*Assistant Examiner*—Mirellys Jagan
(74) *Attorney, Agent, or Firm*—William J. Hallihan; Amin Hallihan, LLC

(57) ABSTRACT

A temperature-indicating target length (15) of an expanding fluid thermometer (11) imbedded inside an object (91) moving in the flow (81) is achieved at a target point (21) along a flow and is measured by a measuring means at a location outside of the flow; where the measuring means can be radiating energy (31) projecting an image (32) of the target length outside the flow, and the measuring means can be causing the fluid length to be locked at the target length, removing the object from the flow, and measuring the target length outside the flow.

26 Claims, 2 Drawing Sheets

1

PRODUCT AND METHOD FOR MEASURING TEMPERATURE IN FLOWING OBJECTS

This application claims benefit of U.S. provisional application 60/246,777 filed 08 Nov. 2000.

A target length of a temperature-indicating fluid length of an expanding fluid thermometer which is inside a flowing object and which reaches the target length at a target point along the flow is measured at a location outside of the flow.

The product provides progress over prior art as shown for example in U.S. Pat. No. 6,250,800.

Figure 1:
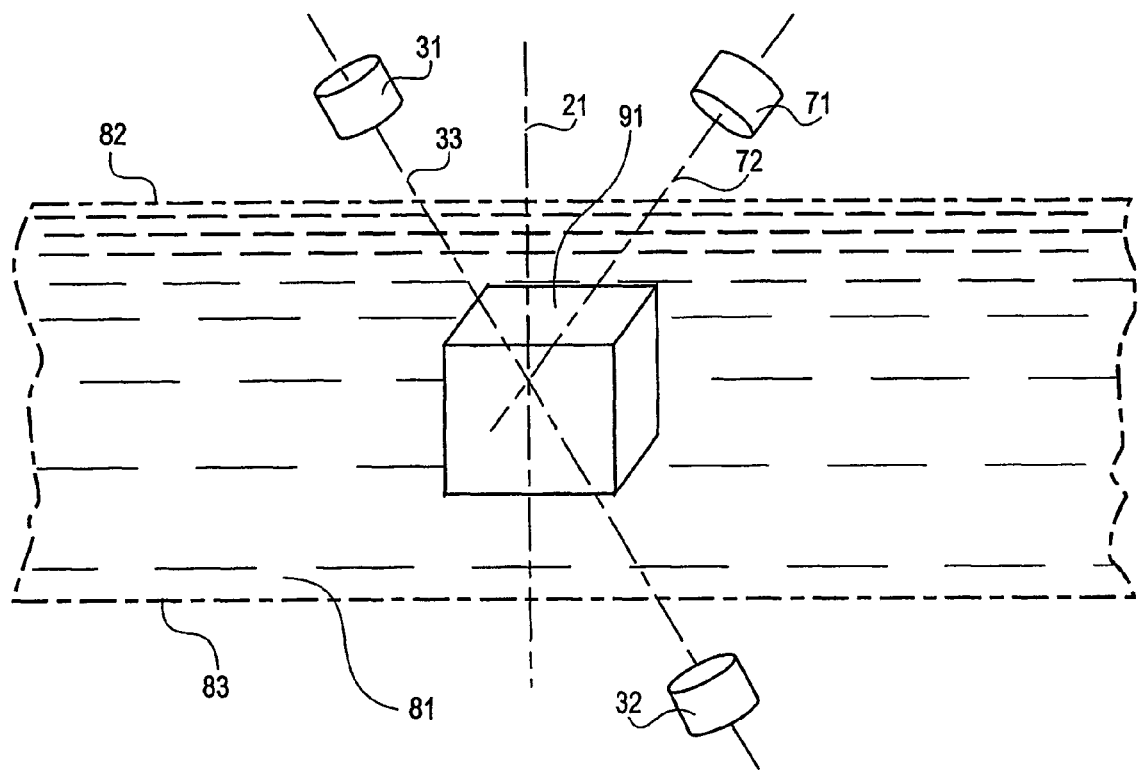
FIG. 1 depicts schematically an object in a flow with imaging and demagnetizing elements.
Figure 2:
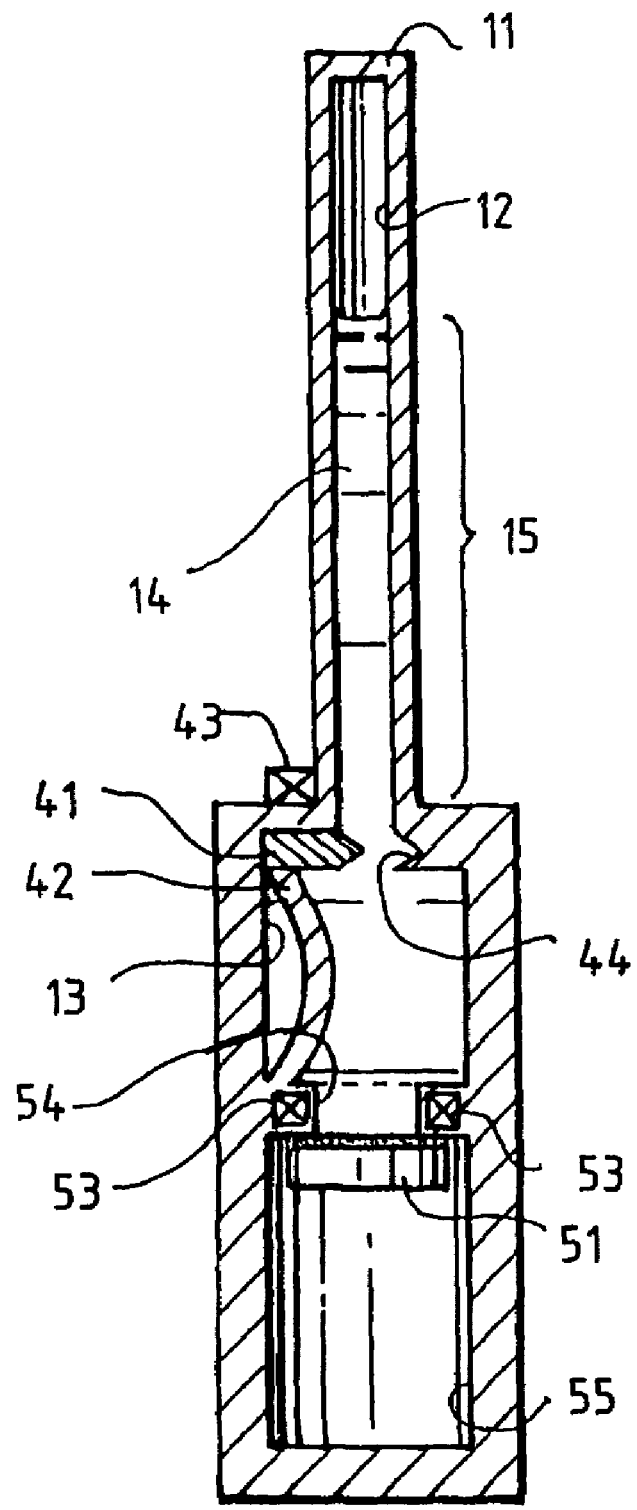
FIG. 2 depicts an expanding fluid thermometer which can be imbedded in the object.

An expanding fluid thermometer 11 is imbedded inside an object 91 moving in a flow 81. The flow boundaries are schematically depicted by the axis lines 82 and 83. Measuring means at a location outside of the flow measures a temperature-indicating fluid length of the thermometer.

The thermometer comprises a channel 12 and a bulb 13 terminating the channel. The bulb and the channel enclose a fluid 14. The fluid expands and contracts to move the fluid to a fluid length 15 in the channel. The fluid length is functionally related to a temperature of the bulb. The thermometer need not have the locking elements depicted.

A point along the flow where it is desired to measure the temperature of the inside of the object is selected as a target point—depicted by the axis line 21—along the flow. The fluid length achieves a target length at the target point.

Measuring means for measuring the target length can comprise an imager 32 which detects radiating energy—indicated by the axis line 33—which has passed through the object at the target point.

The radiating energy can be x-radiation from an x-ray source 31. The measuring means can be that of U.S. Pat. No. 6,250,800.

The imaging can use any of various forms of radiating energy such as various portions of the electromagnetic energy spectrum and acoustic energy. If acoustic energy is used, then the length of the channel empty of fluid would be detected as the means to image the fluid length.

The measuring means for measuring the target length also can comprise locking means for locking the channel so that the fluid length does not thereafter change if the temperature of the bulb changes. Activating means can activate the locking means at the target point. Recovery means can recover the object from the flow. The target length can be measured by various ordinary means after the object has been recovered.

The locking means can be that of international patent application PCT/US 99/15063 which was published as WO 01/01850 A1.

The locking means can comprise a closure—41 and 51 for example—which moves to disconnect the channel and the bulb. The closure can be held from disconnecting the channel and the bulb by a magnetic field 43, 53. The activating means can be a demagnetizing means 71 which demagnetizes the magnetic field so that the closure disconnects the channel and the bulb at the target point.

A closure 41 can have a biased arm 42 which moves the closure across the bulb at the channel to a position 44 which blocks connection between the bulb and the channel. A closure 51 can move to volume-wise enlarge the bulb 54, 55 so that molecular forces connecting fluid in the channel with fluid in the bulb are broken.

Other locking means can be used, such as pinching the column so that after pinching the thermometer will indicate the maximum temperature of the bulb reached after the pinching. This is useful for an object which must not exceed a safe temperature as the object flows through a food distribution system.

There can be a plurality of thermometers in a plurality of objects flowing with the flow. Each of several thermometers from the plurality of thermometers can be interchangeable with any other of the several thermometers.

Each of several thermometers from the plurality of thermometers can be interchangeable with any other of the several thermometers except that each of the several thermometers has identifying markers.

Each of several thermometers from the plurality of thermometers can be interchangeable with any other of the several thermometers except that a first thermometer from the several thermometers has a first functional relationship between a first fluid length and a first temperature of a first bulb, and a second thermometer from the several thermometers has a second functional relationship between a second fluid length and a second temperature of a second bulb. The first thermometer and the second thermometer can have first markers and second markers which identify the first thermometer and the second thermometer and which identify the first functional relationship and the second functional relationship.

There can be a plurality of target points along the flow. The measuring means can measure a plurality of target lengths.

A second thermometer from the plurality of thermometers can be in a second object from the plurality of objects. A second fluid length of the second thermometer can achieve a second target length at the target point The second target length can be measured by the measuring means.

The second fluid length can achieve a second target length at a second target point. The second target length can be measured by a second measuring means interchangeable with the measuring means.

When the measuring means comprises a locking means activated by demagnetization, the second thermometer can require greater demagnetization so that the second thermometer can be activated at a second target point further along the flow and will not be activated at an earlier target point.

The measuring means—and any second measuring means—can be triggered by a trigger (not shown) which detects the arrival of the thermometer—and any second thermometer—at the target point—and at any second target point. The trigger can be any of various elements which can detect the object such as low resolution x-ray imaging, acoustic imaging, and magnetic detection means.

The invention claimed is:

1. A temperature measuring product comprising:
   a thermometer, the thermometer comprising:
   a channel and a bulb terminating the channel,
   the bulb and the channel enclosing a fluid,
   the fluid expanding and contracting to move the fluid to a fluid length in the channel,
   the fluid length being functionally related to a temperature of the bulb;
   the thermometer bulb being inside an object flowing in a flow;

a target point along the flow;
the fluid length being functionally related to the temperature of the object, the fluid length achieving a target length at the target point; and
measuring means for measuring the target length from a location outside of the flow.

2. The product of claim 1 wherein the measuring means for measuring the target length comprises an imager detecting radiating energy which has passed through the object at the target point.

3. The product of claim 2 wherein the radiating energy is x-radiation.

4. The product of claim 1 wherein the measuring means for measuring the target length comprises:
a locking means for locking the channel so that the fluid length does not thereafter change if the temperature of the bulb changes; and
an activating means for activating the locking means at the target point.

5. The product of claim 4 wherein the locking means comprises:
a closure adapted to move to disconnect the channel and the bulb,
the closure being held from disconnecting the channel and the bulb by a magnetic field,
the activating means demagnetizing the magnetic field so that the closure disconnects the channel and the bulb at the target point.

6. The product of claim 5 wherein the closure moves across the bulb at the channel to block connection between the bulb and the channel.

7. The product of claim 5 wherein the closure moves to volume-wise enlarge the bulb so that molecular forces connecting fluid in the channel with fluid in the bulb are broken.

8. A temperature measuring method comprising:
providing a thermometer inside an object flowing in a flow, the thermometer comprising:
a channel and a bulb terminating the channel,
the bulb and the channel enclosing a fluid, the bulb being inside the object flowing in a flow,
the fluid expanding and contracting to move the fluid to a fluid length in the channel,
the fluid length being functionally related to a temperature of the bulb and the object;
selecting a target point along the flow, the fluid length achieving a target length at the target point; and
measuring the target length from a location outside of the flow.

9. The method of claim 8 wherein the object is flowing in the flow through a food distribution system.

10. The method of claim 8 wherein the step of measuring the target length comprises imaging radiating energy which has passed through the object at the target point.

11. The method of claim 10 wherein the step of imaging comprises imaging x-radiation.

12. The method of claim 8 wherein the step of measuring the target length comprises:
locking the channel at the target point so that the fluid length does not thereafter change if the temperature of the bulb changes
recovering the object from the flow.

13. The method of claim 12 wherein the step of locking comprises demagnetizing a magnetic field holding a closure from moving to disconnect the channel and the bulb so that the closure disconnects the channel and the bulb at the target point.

14. The method of claim 8 wherein the object must not exceed a certain temperature as the object is flowing in the flow.

15. The method of claim 14 wherein the object is flowing in the flow through a food distribution system.

16. A temperature measuring product comprising:
a thermometer, the thermometer comprising:
a channel and a bulb terminating the channel,
the bulb and the channel enclosing a fluid,
the fluid expanding and contracting to move the fluid to a fluid length in the channel,
the fluid length being functionally related to a temperature of the bulb;
the thermometer being inside an object flowing in a flow;
a target point along the flow;
the fluid length achieving a target length at the target point;
a lock adapted to lock the channel so that the fluid length does not thereafter change if the temperature of the bulb changes; and
an activator adapted to lock the lock at the target point.

17. The product of claim 16 wherein the lock comprises:
a closure adapted to move to disconnect the channel and the bulb,
the closure being held from disconnecting the channel and the bulb by a magnetic field,
the activator demagnetizing the magnetic field so that the closure disconnects the channel and the bulb at the target point.

18. A temperature measuring product comprising:
a thermometer, the thermometer comprising:
a channel and a bulb terminating the channel,
the bulb and the channel enclosing a fluid,
the fluid expanding and contracting to move the fluid to a fluid length in the channel,
the fluid length being functionally related to a temperature of the bulb;
the thermometer being inside an object flowing in a flow;
a target point along the flow;
the fluid length achieving a target length at the target point;
a closure adapted to move to disconnect the channel and the bulb,
the closure being held from disconnecting the channel and the bulb by a magnetic field,
the closure being activated by demagnetizing the magnetic field at the target point.

19. The product of claim 18 wherein the closure moves across the bulb at the channel to block connection between the bulb and the channel.

20. The product of claim 18 wherein the closure moves to volume-wise enlarge the bulb so that molecular forces connecting fluid in the channel with fluid in the bulb are broken.

21. A temperature measuring product comprising:
a thermometer, the thermometer comprising:
a channel and a bulb terminating the channel,
the bulb and the channel enclosing a fluid,
the fluid expanding and contracting to move the fluid to a fluid length in the channel,
the fluid length being functionally related to a temperature of the bulb;
the thermometer being inside an object flowing in a flow;
a target point along the flow;
the fluid length achieving a target length at the target point; and a lock adapted to lock the channel so that the fluid length does not thereafter change if the temperature of the bulb changes; and an activator adapted to activate the lock at the target point.

22. The product of claim 21 wherein the lock comprises a closure adapted to move to disconnect the channel and the bulb, the closure being held from disconnecting the channel and the bulb by a magnetic field, the activator demagnetizing the magnetic field so that the closure disconnects the channel and the bulb at the target point.

23. The product of claim 22 wherein the closure moves across the bulb at the channel to block connection between the bulb and the channel.

24. The product of claim 23 wherein the closure moves to volume-wise enlarge the bulb so that molecular forces connecting fluid in the channel with fluid in the bulb are broken.

25. A temperature measuring method comprising:

providing a thermometer inside an object flowing in a flow, the thermometer comprising:

a channel and a bulb terminating the channel, the bulb and the channel enclosing a fluid, the fluid expanding and contracting to move the fluid to a fluid length in the channel, the fluid length being functionally related to a temperature of the bulb;

selecting a target point along the flow, the fluid length achieving a target length at the target point;

locking the channel at the target point so that the fluid length does not thereafter change if the temperature of the bulb changes;

recovering the object from the flow.

26. A temperature measuring method comprising:

providing a thermometer inside an object flowing in a flow, the thermometer comprising;

a channel and a bulb terminating the channel, the bulb and the channel enclosing a fluid, the fluid expanding and contracting to move the fluid to a fluid length in the channel, the fluid length being functionally related to a temperature of the bulb;

selecting a target point along the flow, the fluid length achieving a target length at the target point;

demagnetizing a magnetic field holding a closure from moving to disconnect the channel and the bulb so that the closure disconnects the channel and the bulb at the target point recovering the object from the flow.

* * * * *